Figure 1:
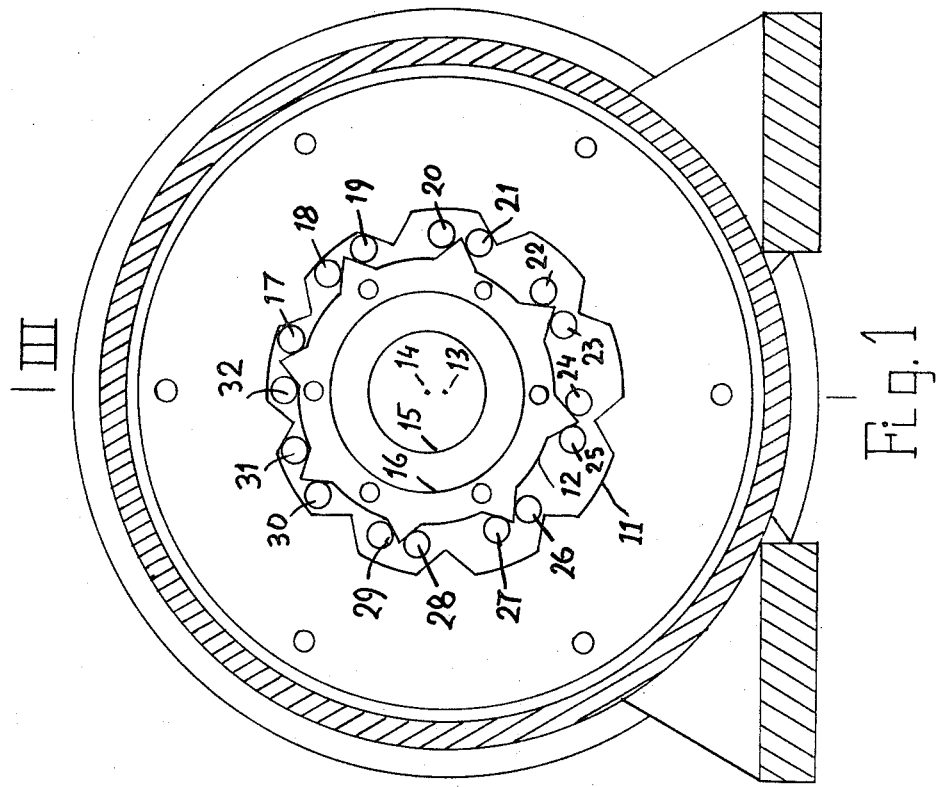

United States Patent [19]
Colinet

[11] 3,783,712
[45] Jan. 8, 1974

[54] HIGH RATIO FRICTIONLESS SPEED REDUCTOR

[76] Inventor: Rene D. Colinet, 4902 N. 13th St., Philadelphia, Pa. 19141

[22] Filed: Mar. 28, 1972

[21] Appl. No.: 238,887

[30] Foreign Application Priority Data
July 30, 1971 Belgium .............................. 770716

[52] U.S. Cl. ...................... 74/805, 74/449, 74/465
[51] Int. Cl. ............................................ F16h 1/28
[58] Field of Search ................. 74/805, 804, 465, 74/449

[56] References Cited
UNITED STATES PATENTS

| | | | |
|---|---|---|---|
| 846,549 | 3/1907 | Clark | 74/449 |
| 1,158,458 | 11/1915 | Dey | 74/805 |
| 2,250,259 | 7/1941 | Foote, Jr. | 74/805 |
| 1,738,662 | 12/1929 | Morison | 74/804 X |
| 2,874,594 | 2/1959 | Sundt | 74/805 |
| 2,990,726 | 7/1961 | McDonald | 74/805 X |
| 3,139,772 | 7/1964 | Maroth | 74/465 X |
| 3,225,616 | 12/1965 | Whitehead | 74/449 |
| 3,307,434 | 3/1967 | Kope | 74/804 |

FOREIGN PATENTS OR APPLICATIONS 924,705   3/1947   France ............................... 74/805

Primary Examiner—Benjamin W. Wyche
Assistant Examiner—J. Reep

[57] ABSTRACT

A mechanical rotary speed reductor for high ratio reduction of speed between an input shaft and an output shaft with no intermediary shaft. With no friction between the teeth of the gears and a unique design, high torques can be transmitted with great mechanical efficiency.

3 Claims, 4 Drawing Figures

HIGH RATIO FRICTIONLESS SPEED REDUCTOR

SUMMARY OF THE INVENTION

This invention relates to mechanical means to reduce rotary speeds from an input shaft to an output shaft when great reduction of speed is desired with minimum power losses due to friction.

Planetary spur gears are often used for high reduction in preference to worm gears which absorb considerable power in friction between teeth. A particular choice of numbers of teeth yields a very high ratio of reduction : it consists in a first pair of meshing gears having n teeth for the sun and ($n-1$) teeth for the planet, said pair being coupled to another pair of meshing gears having $n$ and ($n+1$) teeth respectively. The output speed is $1/n^2$ times the input speed with these four gears.

Unfortunately, this design has serious faults :

1. Commercial standard pitches cannot be used for all four gears because the center distances of both pairs are unequal.
2. Friction losses are considerable because all the teeth contacts carry the full output torque while running at input speeds.
3. Standard spur gears require housings over 3 times their diameters.

The present invention retains the advantageous gear combination mentioned hereabove, but removes the defects listed.

1. Conventional gear cutting is replaced by dihedral teeth easy to mill or to punch out from thin blanks packed and riveted together, finished by broaching. Usually, n is a small number. For 8 – 9 – 10 teeth, the ratio is 81/1. 2. Friction between the teeth is eliminated by inserting rocking rolls between contacting faces, such as between races in roller bearings. 3. By using internal gears, meshing wheels require housing limited to slightly more than one wheel diameter, and the dihedral tooth profile permits meshing gears having for the inner gear only one tooth less than for the outer gear. With standard tooth profiles, a minimum difference of 7 teeth for stub tooth form, or of 12 teeth for full-depth tooth form, is required (Kent Mechanical Engineers' Handbook — 12th edition, page 14–13). Furthermore, the center distance between sun and planet is now reduced to only one-fourth inch in the described preferred form of execution hereafter, simplifying balancing and reducing peripheral speeds for the planets.

The speed reductor of the invention is of the planetary four-gear type and consists in the following parts :

1. A housing containing one input shaft in straight and concentric alignment with a separate output shaft. The input shaft carries an eccentric cylindrical bossing.
2. Two rigidly coupled satellite gears idly mounted to rotate freely around the eccentric bossing.
3. Two solar annular gears provided with internal teeth to mesh with the external teeth of the gears 2). One of the solar gears is rigidly attached to the housing and the other solar gear is mounted on the output shaft. These solar gears are concentric to both shafts.
4. All the teeth of the four gears have straight-sided faces of the dihedral shape, separated by free-spinning rolls bridging every pair of opposite tooth faces. They provide frictionless tooth pressure.
5. All rolls are spaced from each other and they are individually free to move along the faces of the teeth when rolling on the teeth as the latter show the deepest mutual penetration while in revolution.

Figure 2:
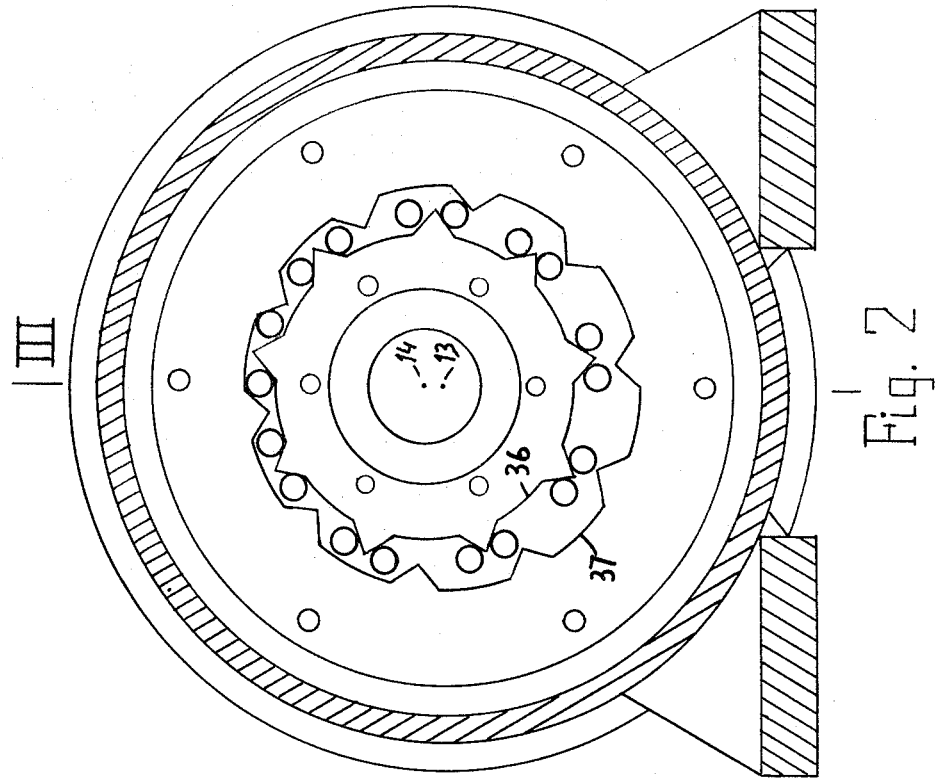
Figure 3:
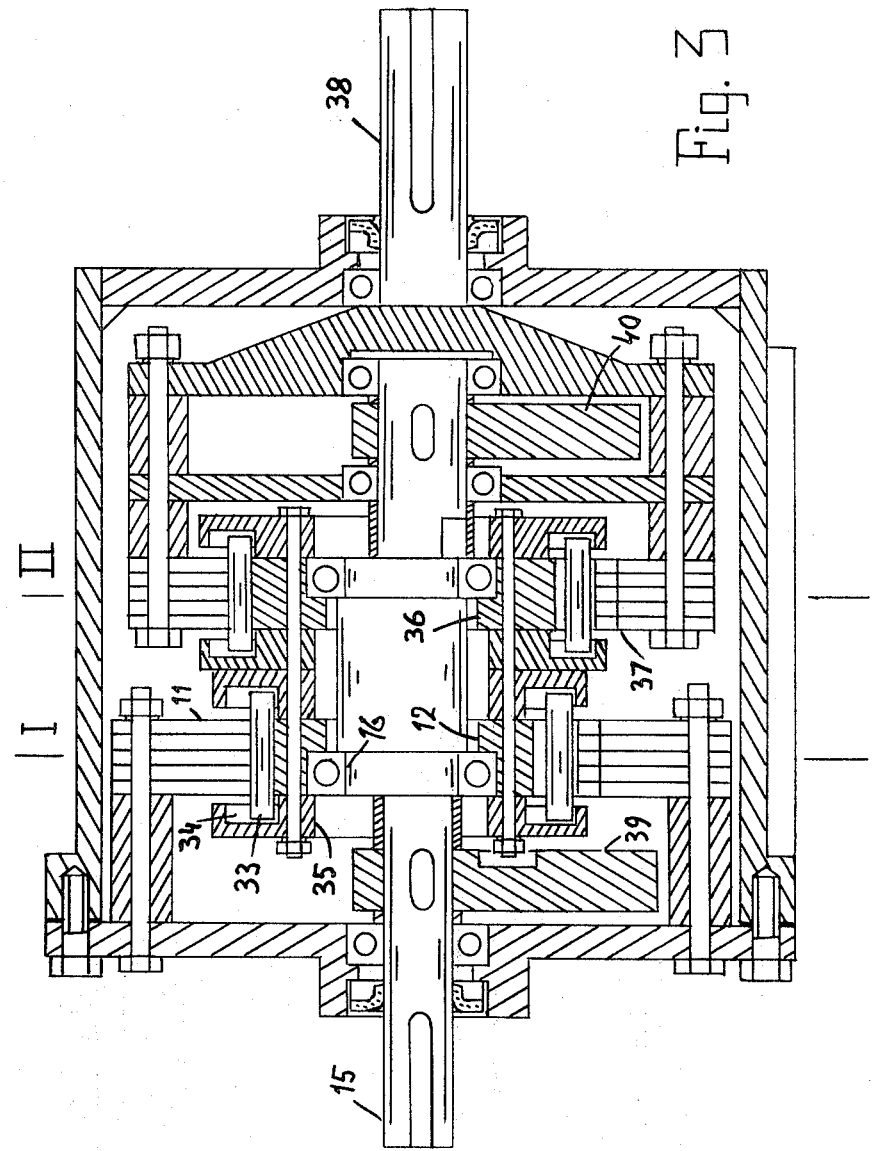
Figure 4:
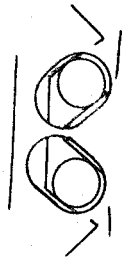

The attached figures illustrate one form of execution of the invention, in which :

FIG. 1 is a cross-section in plane I of FIG. 3
FIG. 2 is a cross-section in plane II of FIG. 3
FIG. 3 is a cross-section by vertical plane III of FIGS. 1 & 2
FIG. 4 is a detail view of the roll cages In FIG. 1 a stationary sun internal type gear 11 is shown, having 9 teeth meshing with an inner planet gear 12 having 8 external teeth. Their respective centers are 13 and 14, quite close to each other.

The eccentric shaft 15 carries gear 12 by ball bearing 16. The contact point of gears 11 and 12 revolves at the input speed which can be very high, such as 1,750 RPM for direct coupling to a small electric motor. But gear 12 itself rotates only 1 tooth per shaft revolution, or 1,750/8 = 218.75 RPM in this example.

The meshing and torque transmission between gears 11 and 12 are obtained by 16 hard free rolls as in bearings, numbered 17 to 32, rocking without friction. Since the active pressure by the teeth on the rolls is limited to the short contact zone ( rolls 31 – 32 – 17 in FIG. 1 ), where radial displacement is minimal, these rolls have a small angular motion only. They are loosely retained by their ends 33 in FIG. 3, engaged in slots 34 of side plates 35 attached to the gear 12.

Centrifugal forces tend to move these rolls outward from the eccentric shaft 15 when not under pressure. When contact and pressure begin, and the gears 11 and 12 get deeper tooth penetration, the rolls move slightly toward the center of gear 12.

The motions of the teeth and rolls are best seen in time succession by looking at the rolls in sequence : clockwise 24 – 26 28 – 30 – 32 or counterclockwise 25 – 23 – 21 – 19 – 17 – 31. These different rolls actually show the true position of a single roll moving in one or the other direction of rotation of the gears.

FIG. 2 shows the second pair of gears 36 and 37 which operate similarly. Gear 36 is coupled solid to gear 12 and drives gear 37 which is connected to the output shaft 38. Gear 36 has 9 teeth and gear 37 has 10 teeth.

The output speed $S_o$ is related to the input speed $S_i$ by the known planetary gear equation which assumes the input shaft 15 being immobilized by a backward rotation of the whole system, at speed $S_i$ :

$$S_o = S_i\, n/n-1 \times n/n+1 - S_i = S_i\, n^2/n^2 - 1 - S_i = S_i\, 1/n^2 - 1$$

In the example above, n is 9 and the reduction is 80/1, with the output speed determined by 1750/80 = 21.875 RPM Other combinations are possible with the same numbers of teeth :

$$S_o = S_i\, n/n\pm1 \times n/n\pm1 - S_i = S_i\, 1/n^2 - 1$$

$S_o = S_i\, n\pm1/n \times n\pm1/n - S_i = S_i\, -1/n^2$ in opposite direction

FIG. 3 shows that the gear box is coaxial and very compact, to be lubricated by splashing oil. Cooling is no problem due to the high efficiency of this transmission.

The counterweights 39 and 40 are attached to the shaft 15 for static and dynamic balancing.

The incline of the dihedral tooth profile is about 30° to 50° to the radius of the gear.

The fundamental $n$ or number of two of the 4 gears may be given any positive numerical value as long as tooth interference can be avoided with rolls and dihedral profile as shown.

Variations of the described device are included within the scope of the present invention insofar as they are functionally equivalent. For instance, the input shaft 15 may be the output shaft of a flange-mounted electric motor coupled by bolting to a mating flange of the gear box.

Having thus described my invention, what I claim as new and desire to secure by Letter Patent is :

1. A mechanical speed reducer of the four-gear planetary type, comprising an input rotating shaft carrying an eccentric cylindrical bossing, two satellite gears coupled rigidly side by side, rotating freely together around the eccentric bossing and provided with external straight-sided teeth of dihedral shape, one solar annular gear concentric with the input shaft and kept stationary with respect to the reductor housing, and provided with internal straight-sided teeth of dihedral shape meshing loosely with one of the said coupled satellite gears, one solar annular gear concentric with the input shaft and mounted on an output shaft which is in alignment with the input shaft, and provided with internal straight-sided teeth of dihedral shape meshing loosely with the other gear of the said satellite coupled gears, with a plurality of free-spinning rolls separating all the straight-sided faces of meshing teeth of all four gears, said rolls being subjected in succession to pressure between said faces, said rolls remaining spaced from each other at all times and being free to move individually along the said contacting faces in the region of deepest penetration of meshing teeth when under intermittent pressure resulting from torque transmission from the input shaft to the output shaft through the gears and the rolls.

2. A mechanical speed reducer of claim 1, where the free-spinning rolls are loosely guided and individually held by their ends in elongated slots integral with and adjacent to the teeth of the gears.

3. A mechanical speed reducer of claim 1, where the gears are stamped out of thin sheet blanks subsequently packed and assembled together in laminated formation.

* * * * *